United States Patent [19]

Jensen et al.

[11] Patent Number: 5,928,701
[45] Date of Patent: *Jul. 27, 1999

[54] PROCESS FOR MAKING FAT-FREE CORN CHIPS

[75] Inventors: John Michael Jensen; David Thomas Biedermann, both of Cincinnati, Ohio; Robert William Johnston, Ashiya, Japan; Robert Daniel Rece, Edgewood, Ky.

[73] Assignee: The Procter & Gamble Company, Cincinnati, Ohio

[*] Notice: This patent issued on a continued prosecution application filed under 37 CFR 1.53(d), and is subject to the twenty year patent term provisions of 35 U.S.C. 154(a)(2).

[21] Appl. No.: 08/622,636

[22] Filed: Mar. 27, 1996

Related U.S. Application Data

[63] Continuation-in-part of application No. 08/486,849, Jun. 7, 1995, abandoned.

[51] Int. Cl.⁶ ................................................ A23L 1/164
[52] U.S. Cl. ........................... 426/560; 426/439; 426/808
[58] Field of Search ................................ 426/549, 560, 426/439, 808

[56] References Cited

U.S. PATENT DOCUMENTS

| | | | |
|---|---|---|---|
| 4,042,714 | 8/1977 | Torres | 426/62 |
| 4,283,425 | 8/1981 | Yuan et al. | 426/102 |
| 4,517,204 | 5/1985 | Mottur et al. | 426/94 |
| 4,645,679 | 2/1987 | Lee, III et al. | 426/560 |
| 4,806,377 | 2/1989 | Ellis et al. | 426/549 |
| 4,834,996 | 5/1989 | Fazzolare et al. | 426/560 X |
| 4,913,919 | 4/1990 | Cornwell et al. | 426/94 |
| 4,985,269 | 1/1991 | Irvin et al. | 426/560 |
| 5,180,601 | 1/1993 | Gaon et al. | 426/242 |
| 5,298,707 | 3/1994 | Sprecher et al. | 219/693 |
| 5,362,511 | 11/1994 | Villagran et al. | 426/549 |
| 5,422,131 | 6/1995 | Elsen et al. | 426/531 |

FOREIGN PATENT DOCUMENTS

| | | |
|---|---|---|
| 2088137 | 2/1994 | Canada . |
| 93/04599 | 3/1993 | WIPO . |
| 94/23591 | 10/1994 | WIPO . |

*Primary Examiner*—Arthur L. Corbin
*Attorney, Agent, or Firm*—Melody A. Jones; Daniel F. Nesbitt; Karen F. Clark

[57] ABSTRACT

The present invention relates to a process for making digestible fat free corn chips. The process for preparing the fat-free corn chips comprises:

a. preparing raw corn chip pieces from a dough comprising a mixture of corn masa and a fat free filler selected from the group consisting of starch, protein and nondigestible fiber, and mixtures thereof; and water; and b. cooking said raw corn chip pieces in nondigestible fat at 300° F. to 450° F. (148.9° C. to 232° C.).

19 Claims, No Drawings

PROCESS FOR MAKING FAT-FREE CORN CHIPS

This is a continuation-in-part of appllication Ser. No. 08/486,849, filed on Jun. 7, 1995, now abandoned.

TECHNICAL FIELD

The present invention relates to a process for making corn chips and similar corn snack food products.

BACKGROUND OF THE INVENTION

Salted snacks such as fabricated corn chips are popular consumer snack products. Many people who enjoy eating corn chips also want to or need to reduce the level of digestible fat in their diets. Corn products contain corn oil so even baked corn chips will contain some digestible fat. Corn masa-based products are made by forming corn masa dough into the desired shape and cooking the shaped masa. These fabricated corn products are preferably cooked by immersing them in a frying fat medium that has been heated to temperatures of approximately 300° F. to 450° F. (148.9° C. to 232° C.). The fabricated snack pieces are fried for varying lengths of time, typically on the order of about 10 seconds to about 3.5 minutes. During frying the pieces absorb a substantial quantity of the frying fat, generally on the order of from about 20% to about 50% by weight of the cooked and seasoned snack or chip. Typically, a digestible-fat, e.g., corn oil, soybean oil, cottonseed oil or peanut oil is used for cooking. These oils have a caloric content of about 9 calories per gram of oil digested. A fried corn snack can contain from about 20 grams to 50 grams of digestible-fat per 100 grams of product which contributes from 180 to 450 calories per 100 grams of product. A single serving of regular corn chips weighs about 30 grams. Five grams of absorbed digestible fat in a regular corn chip serving contributes about 45 calories.

Prior art corn chips as well as chips made from corn flours and corn masa blended with other starches and flavors that are cooked in reduced calorie fat or nondigestible fat are not fat free because the corn itself and many of the other corn chip ingredients contain significant levels of digestible fats. Thus, corn chips made with nondigestible fats can have digestible fats from the corn, emulsifiers and/or fillers, etc. Such chips are not fat free according to recognized standards.

It is an object of the present invention to provide a process for making a 30 gram serving of fat free corn chips which contains less than 0.5 gm of digestible fat per serving.

SUMMARY OF THE INVENTION

The present invention relates to a process for making a digestible fat free corn chips. The process for preparing the fat-free corn chips serving comprises:

a. preparing raw corn chip pieces from an aqueous dough comprising from about 50 parts to about 70 parts of a mixture of corn and a fat free filler selected from the group consisting of starch, protein and nondigestible fibers, and mixtures thereof; said dough comprising from about 30 parts to about 50 parts water by weight of said dough;

b. cooking said raw corn chip pieces in nondigestible fat at 300° F. to 450° F. (148.9° C. to 232° C.) to provide cooked corn chips; and c. optionally adding other ingredients that are essentially digestible fat free; wherein said other essentially fat free ingredients are selected from the group consisting of salt, emulsifiers and fat free seasonings and combinations thereof.

The corn chips comprise from about 20% to 45% of corn, preferably corn masa, from about 20% to about 50% of fat-free filler; from about 23% to about 35% of nondigestible fat; from zero to about 4% moisture; and from zero to 10% other essentially fat free ingredients. The ratio of corn to fat free filler, on a dry weight basis, is from about 68:32 to about 30:70, preferably from about 50:50 to about 43:57. Any residual or intrinsic digestible fat in the 30 gram serving is negligible and according to a recognized nutritional authority the serving is fat free.

DETAILED DESCRIPTION OF THE INVENTION

The present invention relates to low moisture triglyceride-fat free cooked corn snack food products. These snack food products comprise corn masa, a triglyceride fat free filler (FFF) selected from the group consisting of starch, protein and nondigestible fibers, moisture and a nondigestible frying fat composition. The "fat free" cooked corn snack food product surprisingly has acceptable taste even though it contains only up to or has less than about 0.5 grams triglyceride-fat per 30 grams of product. Regular corn snack food products generally contain about 33% digestible fat. The product of this invention contains essentially no digestible fat, but can contain up to 35% nondigestible fat which contributes to the flavor. The product surprisingly has acceptable greasiness impression, good mouthfeel lubriciousness and a very good taste.

These snack food products preferably comprise:

A) from about 20% to 45% corn, preferably 25%–35% of corn masa;

B) from about 20% to about 50%, preferably 30%–40% of a fat free filler selected from the group consisting of starch, protein and nondigestible fibers, and mixtures thereof;

C) from zero to 10%, preferably 2% to 6% seasonings;

D) from about zero to about 4%, preferably 0.5%–3% water; and

E) from about 1% to about 35%, preferably 25%–32% of a nondigestible fat composition.

The nondigestible fat component preferably comprises a blend of a liquid nondigestible oil and particles of nondigestible solid polyol polyester or other nondigestible solid. The preferred polyol polyester solid particles have a thickness of about 1 micron or less and are dispersed in the liquid nondigestible oil in an amount sufficient to control passive oil loss upon ingestion of the liquid nondigestible oil.

As used herein, the term "low moisture food" refers to a food having an end product moisture content of about 5% or less, preferably about 4% or less, more preferably about 3% or less, and most preferably less than 2%.

As used herein the term "fat free" or "digestible fat free" refers to foods which contain substantially no digestible fat. The product will contain less than 0.5 gm per 30 gm serving. The products will contain nondigestible fat.

The cooked snack food products of this invention are corn chips, for example, fried, baked and/or extruded salted snacks such as corn chips, tortilla chips, corn sticks, corn curls and corn puffs, pellet snacks, half products, crackers and other extruded snacks based on corn.

Corn

When corn is converted to flour or masa, the flour or masa can contain corn oil, a digestible fat. The snack food products of this invention preferably contain an intrinsically low fat corn flour or masa. A low fat corn masa comprises less than 4% edible triglycerides. Some corn masas have only about 2% fat and are highly preferred as starting material. Examples of some corn masa and their fat levels are set out below in the Table 1.

TABLE 1

Fat Content of Different Commercial Dry Masa

| DRY MASA | FAT % |
|---|---|
| Azteca Yellow | 3.6 |
| Azteca White | 4.0 |
| Illinois Yellow | 2.7 |
| Illinois White | 2.5 |
| Quaker Yellow | 4.0 |
| Quaker White | 3.8 |
| ConAgra Yellow | 3.5 |

Fat Free Filler

Starch is the preferred fat free filler. The starch can be derived from any grain or vegetable such as corn starch, wheat starch, tapioca, potato starch and rice starch. The following is a list of non-starch polysaccharides and proteins that could also conceivably be utilized, either alone or in various combinations, as fillers or bulking agents for corn-based snacks.

These fillers are free of digestible fats but can contain nondigestible fats.
Non-Starch Polysaccharides
Cellulose
Cellulose Ethers, e.g. Methylcellulose, Hydroxypropyl methylcellulose, and Hydroxypropyl cellulose
Carboxymethyl cellulose
Microcrystalline cellulose
Fiber (such as oat fiber) from vegetables, fruits or grains
Polydextrose
Citrus Absorbing Material (CAM) see U.S. Pat. No. 4,783, 239 and U.S. Pat. No. 4,875,974 issued to T. F. Rich
Pectins
Gums, e.g. Alginates, Carrageenans, Guar gum, Locust bean gum, Gellan gum, Gum Tragcanth, Gum Acacia, Gum Tragcanth, Gum Ghatti, Gum Karaya
Proteins
  The protein can be derived from any suitable source such as:
Total milk protein (dried precipitate of casein and whey)
Dried whey
Whey protein concentrate
Whey protein isolate
Casein, e.g. acid casein or rennet casein
Caseinates, e.g. sodium caseinate, potassium caseinate, calcium caseinate
Nonfat dry milk
Nuts, e.g., peanuts walnuts, pecans
Soybean flour (defatted)
Soy protein concentrate
Soy protein isolate
Cereal proteins, e.g. Vital wheat gluten
  Oat bran
  Corn protein isolate The ingredients of the low moisture cooked snack food products of the present invention, the relationship of the ingredients, and the preparation of the snack food products herein, are described in detail as follows:

I. Ingredient Materials

The materials used to prepare the nondigestible low moisture cooked snack food products of the present invention include an edible substrate and a nondigestible fat composition which is incorporated into and/or onto the edible substrate.

A. Edible Substrate: Corn Masa and Non-Fat Solid

The edible substrate comprises fabricated corn chip pieces. As used herein, the term "fabricated pieces" refers to corn pieces obtained from a dough sheet formed from aqueous corn flour or masa dough. The dough comprises from about 30% to 50% water, 40% to 50% corn masa, 0% to 5% emulsifier and 20% to 50% fat free filler.

B. Nondigestible Fat Compositions

Another essential ingredient of the low moisture cooked snack food products of the present invention is a nondigestible fat composition. All edible nondigestible fats are included. Such nondigestible fat compositions contain a nondigestible fat component and little or no conventional triglyceride-fat component.

For purposes of this invention a liquid oil is one which has a complete melting point below about 37° C. Suitable liquid nondigestible edible oils for use herein include liquid polyol fatty acid polyesters (see Jandacek, U.S. Pat. No. 4,005,195, issued Jan. 25, 1977); liquid esters of tricarballylic acids (see Hamm; U.S. Pat. No. 4,508,746, issued Apr. 2, 1985); liquid diesters of dicarboxylic acids such as derivatives of malonic and succinic acid (see Fulcher, U.S. Pat. No. 4,582,927, issued Apr. 15, 1986); liquid triglycerides of alpha-branched chain carboxylic acids (see Whyte, U.S. Pat. No. 3,579,548, issued May 18, 1971); liquid ethers and ether esters containing the neopentyl moiety (see Minich, U.S. Pat. No. 2,962,419, issued Nov. 29, 1960); liquid fatty polyethers of polyglycerol (See Hunter et al., U.S. Pat. No. 3,932,532, issued Jan. 13, 1976); liquid alkyl glycoside fatty acid polyesters (see Meyer et al., U.S. Pat. No. 4,840,815, issued Jun. 20, 1989); liquid polyesters of two ether linked hydroxypolycarboxylic acids (e.g., citric or isocitric acid) (see Huhn et al., U.S. Pat. No. 4,888,195, issued Dec. 19, 1989); all of which are incorporated herein by reference, as well as liquid polydimethyl siloxanes (e.g., Fluid Silicones available from Dow Corning).

The preferred nondigestible fat are fatty materials having properties similar to triglycerides such as sucrose polyesters but are not absorbed or digested by the body. A preferred sucrose polyester is OLEAN® made by The Procter & Gamble Company. These preferred nondigestible fat or oil substitute compositions are described in the literature, for example, in Young, U.S. Pat. No. 5,085,884, issued Feb. 4, 1992, and U.S. Pat. No. 5,422,131, issued Jun. 6, 1995 to Elsen et al., incorporated herein by reference therefore.

The nondigestible fat compositions comprise from about 99% to 100% nondigestible fat and from 0% to about 1% triglyceride-fat. Preferably, such compositions comprise about 100% nondigestible fat.

II. Dough Formation

A particularly important aspect of the process herein is the formation of the dough. The dough is formed by combining corn flour or masa and starch based flour or other fat free fillers and water. Optional material such as emulsifiers, salts, flavorants, preservatives, calcium carbonate, hydrolyzed starch and etc., can also be added to the dough. Any conventional mixing can be used to make the dough.

Sheeting, Snack Piece Formation and Frying

Once prepared, the dough is then formed into a relatively flat, thin sheet. Any method suitable for forming such sheets from starch based doughs can be used. For example, the sheet can be rolled out between two counter rotating cylindrical rollers to obtain a uniform, relatively thin sheet of dough material. Any conventional sheeting, milling and gauging equipment can be used.

Doughs of the present invention can be formed into a sheet having a thickness of from about 0.015 to about 0.035 inches (from about 0.038 to about 0.09 cm), and preferably to a thickness of from about 0.015 to about 0.025 inches (from about 0.038 to about 0.062 cm).

The dough sheet is then formed into snack pieces of a predetermined size and shape. These snack pieces can be formed using any suitable stamping or cutting equipment.

The snack pieces can be formed into a variety of shapes. For example, the snack pieces can be in the shape of ovals, squares, circles, a bowtie, a star wheel, or a pin wheel.

The snack pieces are fried. Preferably the snacks are prepared by a continuous frying method. They may also be constrained during frying. An apparatus as described in U.S. Pat. No. 3,626,466 (Liepa, 1971) can be used for constrained frying. The dough pieces are cut from the sheet, shaped using a movable, apertured mold half to shape the cut dough pieces and then held during subsequent frying by a second apertured mold half. A reservoir containing a frying medium is used. The shaped, constrained pieces are passed through the frying medium until they are crisp and have a final moisture content of from about 0.5% to about 4%. Continuous frying or batch frying of the snack pieces in a non-constrained mode is also acceptable. In this method the pieces are immersed in the oil on a moving belt or in a basket.

If desired, the snack pieces can be fried to moisture contents of 10% or less and then heated with hot air, superheated steam or inert gas to lower the moisture level to 4% or less. This is a combined frying/baking step.

The snack pieces are fried at temperatures between about 300° F. (148° C.) and 450° F. (232° C.). The exact fry time is controlled by the temperature of the oil and the starting water content. The fry time and temperature is easily determined by one skilled in the art.

U.S. Pat. No. 4,806,377, issued Feb. 21, 1989, to Ellis et al., for "Waxy Corn Masa Based Products and Method of Making" teaches corn types and corn chip baking details.

The snack pieces can also be coated with a non-digestible fat and baked using radiant, convection or microwave heating to lower the moisture content. The coating can be accomplished by dipping, spraying, surface application, etc.

III. Preparation of the Fat Free. Low Moisture Cooked Corn Snack Food

A. Incorporation of Nondigestible Fat Composition Into Edible Substrate

The low moisture cooked corn snack food products have a nondigestible fat composition of the type described above incorporated into and/or onto an edible substrate of the type described above.

One means of incorporating the nondigestible fat compositions into the edible substrate is to apply the nondigestible fat composition to the exterior surface of the edible substrate. Snack food products prepared by applying the fat compositions to a portion or all of the surface of the edible substrate are referred to as fat-coated foods. The nondigestible fat composition can also be incorporated into the interior of the edible substrate by direct addition to the dough or through absorption during cooking.

The low moisture snack food products herein are preferably coated with these compositions. The nondigestible fat compositions can be applied by a variety of means including immersing, dipping, soaking, spraying, blowing, pouring, pan coating, (e.g., in a revolving pan), tumble coating, brushing, applying with a roller, rolling around in a container of nondigestible fat composition, falling film methods, enrobing, and curtain coating. The fat composition can be heated during application to the edible substrate, such as in the case of frying. If desired, the nondigestible fat compositions can be applied to the surface of the food, followed by heating, such as baking in the case of baked foods. The nondigestible fat composition can also be applied to the surface of a food that already contains fat. Once applied to the surface, the nondigestible fat composition is typically absorbed into the interior of the food, such as in the case of fabricated corn snack, corn chips and tortilla chips.

Additional nondigestible fat is added in a sprayer or enrober. For the nondigestible fat compositions herein, the fat is heated to above 170° F. (67° C.) or its melt point before application to the snack. Preferably the nondigestible fat composition is applied at temperatures of from 170° F. (67° C.) to about 250° F. (121° C.). To enhance the absorption of the nondigestible fat into the snack, the snack is held for a period of time, generally from 1 to 5 minutes, at 67° C. or above.

B. Providing the Desired Fat Content for the Finished Snack Food Product

Incorporation of the nondigestible fat composition into the edible substrate according to the means described above can result in snack food products which are either too greasy or not lubricious. This is because the total nondigestible fat content of the finished snack food product is either too high or too low. Snack food products with high fat contents will taste undesirably greasy.

1. Pre-Cooking Treatments

One way to provide snack food product having the desired fat contents is to treat fabricated corn snacks or the dough used to prepare fabricated snacks prior to cooking. For example, the absorption of fat into fabricated snack during frying can be reduced by increasing the thickness of the snack pieces. However, corn chips made from 100% normal corn-masa contain too much intrinsic fat to be a fat free snack piece even when fried in the nondigestible fat.

Another way to reduce the amount of fat absorbed by the corn snack during frying is to partially dry the fabricated corn snack using convection or microwave heating prior to frying. In addition, coating raw fabricated corn snack with a thin hydrocolloid film (e.g., cellulose ethers, high amylose starch, protein, etc.) will limit fat absorption during frying and result in finished chips having a lower total fat content.

The amount of fat absorbed by corn snacks during frying can be limited by careful control of the dough moisture level prior to frying and/or by incorporating maltodextrin into the dough used to prepare the fabricated snacks. For baked snack food products, the fat content of the finished snack product can be controlled via formulation of the dough and the amount of topical coating or addition.

A proofer box is used in tortilla snacks manufacturing to equilibrate the moisture within the dough before frying. This process can be used for the fabricated snacks herein.

2. Treatment of Edible Substrate During Cooking

When the nondigestible fat composition is incorporated into the edible substrate by means of frying, the amount of fat absorbed by the edible substrate can be limited by frying at a low initial temperature with an increasing temperature profile through the fryer. (See Bensen et al., U.S. Pat. No. 5,137,740, issued Aug. 11, 1992 and Swedish Patent Application 1,519,049, Published Jul. 26, 1978). In addition, coating fabricated corn snack or fabricated snack products with a thin film of the nondigestible fat composition and then baking in a convection or microwave oven can result in a desirable fat content for the finished snack product (see Dreher et al., U.S. Pat. No. 4,756,916, issued Jul. 12, 1988, Yau et al., U.S. Pat. No. 4,283,425, issued August 1981, and Mehta et al., Canadian Patent 1,151,945, issued Aug. 16, 1983).

3. Post-Cooking Treatments

Another way to provide snack food products having desirable nondigestible fat contents is to remove a portion of the nondigestible fat composition after it has been incorporated into and/or onto the edible substrate. The nondigestible fat compositions may be removed from the snack food by any conventional post-fry treatment used for the removal of triglyceride-fats from snack food products. For example, the fat can be removed from the surface of the snack food product by steam stripping (see, for example, Neel et al., U.S. Pat. No. 4,933,199, issued Jun. 12, 1990 and Young et al., U.S. Pat. No. 5,171,600, issued Dec. 15, 1992) or by treatment of the snack food product with a solvent such as supercritical $CO_2$ or hexane to solubilize a portion of the surface and interior fat contained in the snack food product (see, Goulston, U.S. Pat. No. 3,127,271, issued Mar. 31, 1964, and Kazlas et al., World Patent Application US91/05950 (publication number WO 92/03064), Published Mar. 5, 1992). Nondigestible fat can also be removed from the surface of the snack food product by immersing the snack food product in a liquid displaying a low solubility for the nondigestible fat composition, e.g., ethanol, for from about 0.5 to about 5 minutes to physically rinse the nondiges,ible fat from the surface of the snack food products. Residual solvent on the snack food product is then removed by heating under vacuum.

In addition, the fat can be removed from the surface of the snack food product by contacting the snack food product with a blast of hot air or nitrogen following frying (see, for example, Bernard, U.S. Pat. No. 4,537,786, issued Aug. 27, 1985) or by centrifugation of fried snack food products while simultaneously contacting the snack food product with superheated steam, saturated steam, or a mixture of steam and hot dry air (see Hai et al., Canadian Patent 957,896, issued Nov. 19, 1974).

ANALYTICAL TEST METHODS

A number of parameters used to characterize elements of the present invention are quantified by particular experimental analytical procedures. Each of these procedures is described in detail as follows:

Fat Content of Fabricated Corn Snack

The fat content of fabricated corn snack can be determined by Soxhlet extraction as follows:

Equipment/Reagents:

Soxtec HT6 Extractor, water bath, hot oil bath, extraction beaker, extraction thimble, vacuum drying oven, nitrogen purging gas, methylene chloride, boiling s tones, glass wool Procedure:
1. Weigh the extraction thimble (to four places 0.0001) and record as tare.
2. Load approximately 8–12 grams of ground chip sample into thimble and record as gross weight (to 0.0001).
3. Place glass wool on top of chip sample in thimble to contain the chips in the thimble.
4. Place 2–3 boiling stones into extraction beaker, weigh, and record weight as tare (to 0.0001).
5. Add 50 ml of methylene chloride to extraction beaker.
6. Load extraction beaker and the thimble containing the chip sample into extractor.
7. Set oil bath at 110° C. and water bath at 28.3° C. and allow to equilibrate.
8. Lower thimble into extraction beaker and allow to boil for 60 minutes, with the condenser pet cock opened.
9. Raise thimble out of extraction beaker and rinse for 60 minutes.
10. Turn the condenser's pet cock to closed position, purge with nitrogen and allow methylene chloride to evaporate for 60 minutes.
11. Place extraction beaker into vacuum oven at 120° C. for 30 minutes.
12. Allow extraction beaker to cool to room temperature, weigh (to 0.0001) and record as final weight (weight beaker, boiling stones and extracted fat).

Calculations:
1. Chip Sample Weight=gross wt (step 2)–tare wt (step 1)
2. Extracted Fat wt=final wt (step 12)–tare wt (step 4)
3. Fat Content (%)=[Extracted Fat wt/chip sample wt]×100

5. Moisture Content of Fabricated Low Moisture Snack

The moisture content of a snack food product can be determined by a forced air oven volatiles method as follows:

Equipment:

Forced air oven, aluminum tins with lids, Cabinet-type desiccator

Procedure:
1. Weigh tin and lid to 0.0001 grams and record weight as tare weight
2. Place 2—3 gram ground chip sample into tin, weigh to 0.0001 grams and record as gross weight
3. Set oven temperature to 105° C.
4. Place tin containing the chip sample in oven for 1 hour, uncovered
5. Remove tin containing the sample from the oven, cover the tin, and place in desiccator until cooled to room temperature
6. Weigh tin, lid and dried sample to 0.0001 grams and record as final dried weight Calculations:
1. Sample weight=gross wt.–tare wt.
2. Final weight=weight recorded in step 6
3. Moisture Content (%)=[(gross wt–final wt.)/sample wt]×100.

TABLE 2

Ratios of Corn Masa to Fat Free Filler on a Dry Weight Basis

| Range: | 68:32 to 30:70 |
|---|---|
| Preferred Range: | 50:50 to 43:57 |

EXAMPLES

Process Example A

Fabricated corn chip dough pieces are prepared.

The corn base and starch are pre-measured and added to a mixer. Measured amounts of distilled water (about 47 parts) and an effective amount (about 1 to 3 parts) of an essentially fat free emulsifier, are placed into a beaker and heated to 100° F. (38° C.). The water and emulsifier are stirred briefly and then added to the mixer. The complete mixture is blended for 2 minutes, stopped and the sides scraped. The mixture is then blended for another 2 minutes. The blended material is transferred to a Farinagraph equipped with a twin blade self-wiping mixing head, the head held at 100° F. (38° C.). The Farinagraph is run at 100 rpm until a reading of 350 Brabender units (BU) is reached. The dough is formed. The dough is then removed from the mixing head, pushed into rough ball-shapes and transferred to the roll mill. Each ball is then passed through an 8" twin roll mill with a set gap of 0.3 to 0.5 millimeter to obtain a dough sheet thickness of about 0.64 millimeter. The sheet is then cut into corn chip pieces.

The dough pieces are deep fried in hot OLEAN®, a sucrose polyester frying oil for 20 to 25 seconds. The frying oil comprises a blend consisting of about 6% solid nondigestible particles and about 94% of liquid cottonseed sucrose polyester having the following attributes:

The OLEAN® used in Examples 1–3 is a 99.5% nondigestible-cooking-fat described herein above. The corn chips have about 0.4 g. of digestible-fat, i.e., less that 0.5 grams of digestible-fat (DF) per 30 grams of said product. They are essentially fat-free as according to FDA nutrition authority. (See the U.S. FDA's guidelines in 21 CFR §101.62.) Yet these snack food products taste very good.

The liquid sucrose polyester OLEAN® has the following attributes:

| Fatty Acid Composition* | |
|---|---|
| | % |
| Fatty Acid | |
| $C_{14}$ | 0.5 |
| $C_{16}$ | 20.3 |
| $C_{18:0}$ | 6.2 |
| $C_{18:1}$ | 37.3 |
| $C_{18:2}$ | 34.2 |
| $C_{18:3}$ | 0.3 |
| $C_{20}$ | 0.3 |
| $C_{22:1}$ | — |
| $C_{22:0}$ | — |
| $C_{24}$ | — |
| Other | 0.9 |
| Ester Distribution | |
| % Octa | 74.6 |
| % Hepta | 25.0 |
| % Hexa | <0.1 |
| % Penta | <0.1 |
| % Lower | <0.1 |

The frying oil has a Waxy/Greasy Thixotropic Area Value of 115 kPa/s. The oil is fried at a temperature of 350° F. (177° C.) and exits at approximately 330° F. (166° C.).

The solid nondigestible particles are formed from sucrose polyesters in which the ester groups are formed from fatty acids derived from soybean oil and $C_{22}$ saturated fatty acids. The solid sucrose polyester has the following attributes:

| Fatty Acid Composition | |
|---|---|
| $C_{14}$ | — |
| $C_{16}$ | 1.7 |
| $C_{18:0}$ | 1.9 |
| $C_{18:1}$ | 4.0 |
| $C_{18:2}$ | 10.5 |
| $C_{18:3}$ | 0.7 |
| $C_{20}$ | 5.0 |
| $C_{22:1}$ | 0.2 |
| $C_{22:0}$ | 73.7 |
| $C_{24}$ | 1.9 |
| Other | 0.4 |
| Ester Distribution | |
| % Octa | 79.8 |
| % Hepta | 20.2 |

| Fatty Acid Composition | |
|---|---|
| % Hexa | <0.1 |
| % Penta | <0.1 |
| % Lower | <0.1 |

Process Example B

Fabricated corn chip dough pieces are prepared.

Tortilla chips are prepared from alkali-treated low digestible fat containing corn dough, i.e. masa. To prepare masa, dried corn is steeped in a water and lime solution (pH=11.2) in a steam-jacketed vessel. The mixture is heated to boiling and then cooled to between 115° F. and 140° F. The corn is allowed to soak for 8 to 24 hours until the moisture content of the corn reaches about 50% (Note that the moisture level can be allowed to reach from 30 to 80%; however, 40 to 60% moisture is preferred and more preferred is 45% to 55%).

Following steeping, the corn is washed and then uniformly ground or milled into a masa dough.

A fat free filler is added to the milled corn masa and uniformly ground or milled into a dough. The fat free filler starch is added to reduce the level of digestible-fat in the corn masa dough so that the final product has less than about 0.5 grams of digestible fat per 30 grams of product.

The masa dough is sheeted at a thickness of about 0.050" (0.125cm) and 0.060" (0.15 cm) and cut into dough pieces. The dough pieces can be partially baked in an oven for 12 to 18 seconds at a temperature between 750° F. and 900 ° F. (399° C. to 483° C.) to lower the moisture level. The moisture content of the partially cooked dough pieces exiting the oven are between 35% and 40%.

The dough pieces are then batch fried in a 5-lb. capacity batch fryer containing frying oil. The frying oil comprises 100% of a sucrose polyester blend comprising about 6% solid nondigestible particles and about 94% liquid soybean oil sucrose polyester. The Waxy/Greasy Thixotropic Area Value of the frying oil is 75 kPa/s. The frying oil is maintained at a temperature of 365° F. (185° C.). The dough pieces are fried for about 90 seconds.

Upon removal from the fryer, they are seasoned for serving. A 30 gram serving of these cooked and seasoned tortilla chips are digestible-fat free with a nondigestible-fat content of about 26.8% and a moisture content of about 1.0%.

Examples 1–6 are products which can be prepared by the process of this invention.

| Example 1 | | | |
|---|---|---|---|
| | Mass | % DFAT | DFAT % |
| Starch | 20.6 | 0.00% | 0.00 |
| Corn | 43.4 | 2.70% | 1.17 |
| OLEAN* | 32.0 | 0.50% | 0.16 |
| Water | 2.0 | 0.00% | 0.00 |
| Emulsifier | 0.5 | 0.50% | 0.00 |
| Misc. | 1.5 | 0.00% | 0.00 |
| DFAT | 100.00 | | 1.33 |
| DFAT per 30 | | = | 0.4 gm |

DFAT is digestible fat
*OLEAN is a commercially available nondigestible frying fat described below and available from The Procter & Gamble Co., Cincinnati, Ohio.

A 30 gram serving of these corn chips of this Example is essentially fat free having a negligible level of digestible fat per serving. Starch is a fat free filler. OLEAN is a nondigestible fat. The level of digestible fat in the corn masa for this example is about 0.27 gm per serving. The ratio of corn and starch (FFF) in Example 1 is about 68:32. The ratio of the corn plus the fat free filler and the balance of the corn chips is about 64:36.

Example 2

|  | Mass | (% DFAT) | DFAT % |
|---|---|---|---|
| Starch | 49.7 | (0.00%) | 0.00 |
| Corn | 21.3 | (4.00%) | 0.85 |
| OLEAN | 25.0 | (0.50%) | 0.13 |
| Water | 2.0 | (0.00%) | 0.00 |
| Emulsifier | 0.5 | (0.50%) | 0.00 |
| Misc. | 1.5 | (0.00%) | 0.00 |
| DFAT | 100.00 | | 0.98 |
| DFAT per 30 g | | = | 0.29 gm. |

The level of digestible fat in the corn for this example is 4%. The ratio of corn and starch (FFF) in Example 2 is about 30:70. The ratio of the corn plus the FFF to the balance of the corn chips is about 71:29. A 30 gram serving of these corn chips of this Example is essentially fat free having a 0.29 gram of DFAT per serving.

Example 3

|  | Mass | (% DFAT) | DFAT % |
|---|---|---|---|
| Starch | 32.0 | (0.00%) | 0.00 |
| Corn | 32.0 | (3.00%) | 0.96 |
| OLEAN | 32.0 | (0.50%) | 0.16 |
| Water | 2.0 | (0.00%) | 0.00 |
| Emulsifier | 0.5 | (0.50%) | 0.00 |
| Misc. | 1.5 | (0.00%) | 0.00 |
| Total | 100.00 | | 1.12 |
| DFAT per gms | | = | 0.34 gm. |

A 30 gram serving of these corn chips is essentially fat free having a negligible 0.34 gram of digestible fat per serving. The ratio of corn and starch (FFF) in Example 3 is about 50:50.

Example 4

|  | Mass | (% DFAT) | Total DFAT |
|---|---|---|---|
| Starch | 38.7 | (0.00%) | 0.00 |
| Corn | 29.8 | (4.00%) | 1.19 |
| OLEAN | 27.5 | (0.50%) | 0.14 |
| Water | 2.0 | (0.00%) | 0.00 |
| Emulsifier | 0.5 | (0.50%) | 0.00 |
| Misc. | 1.5 | (0.00%) | 0.00 |
| Total | 100.00 | | 1.33 |
| DFAT per 30 gms | | = | 0.40 gram |

The corn chips of this Example have a negligible 0.4 gram of digestible fat (DFAT) per 30 gram serving. The ratio of corn and fat free filler starch (FFF) in Example 4 is about 44:56. The ratio of the corn plus the FFF starch and the balance of the chips is about 69:31 and the ratio of the corn plus the FFF starch and the non-digestible fat (NDF) is about 71:29.

Example 5

|  | Parts | Total DFAT |
|---|---|---|
| Starch | 34.7 | 0.00 |
| Corn | 38.8 | 1.55 |
| OLEAN | 23.0 | 0.12 |
| Water | 2.0 | 0.00 |
| Seasoning. Misc. | 1.5 | 0.00 |
| Total | 100 | 1.67 |
| Total DFAT per 30 g | | Under 0.50 gm |

The corn chips of this Example have a negligible level of digestible fat per 30 gram serving.

Example 6

|  | Mass | (% DFAT) | Total DFAT |
|---|---|---|---|
| FFF | 38.7 | (0.00%) | 0.00 |
| Corn | 29.8 | (4.00%) | 1.19 |
| OLEAN | 27.5 | (0.50%) | 0.14 |
| Water | 2.0 | (0.00%) | 0.00 |
| Emulsifier | 0.5 | (0.50%) | 0.00 |
| Misc. | 1.5 | (0.00%) | 0.00 |
| Total | 100.00 | | 1.33 |
| DFAT per 30 gms | | = | 0.4 gram |

The corn chips of this Example have 0.4 gram of digestible fat per serving. Example 6 has equal amounts of starch, fat-free protein and nondigestible fiber

What is claimed:

1. A process of preparing digestible fat free corn chips comprising the steps of:
    a. preparing raw corn chip pieces from an aqueous dough comprising, by weight, from about 50 parts to about 70 parts of a mixture of corn masa having about 4% or less, by weight, digestible fat, and a fat free filler selected from the group consisting of starch, protein, nondigestible fiber, and mixtures thereof, wherein the ratio of corn masa to fat free filler, on a dry weight basis, is from about 68:32 to about 30:70; from about 30 parts to about 50 parts water; and from 0 to 10 parts essentially fat free ingredients other than said fat free filler; and
    b. cooking said raw corn chip pieces in nondigestible fat at 300° F. to 400° F. (148.9° C. to 204.4° C.); and
    wherein when cooked, said corn chips comprise, by weight, from about 20% to about 45% corn masa; from about 20% to about 50% of fat-free filler; from about 1% to about 35% of nondigestible fat; from 0% to about 4% moisture; and from about 0% to about 10% of essentially fat free ingredients other than said fat free filler; and wherein said corn chips contain less than about 0,5 gram of residual and/or intrinsic digestible fat per 30 gram serving.

2. The process of claim 1 wherein said corn chips comprise from about 25 to about 35% of corn masa; from about 30 to about 40% of fat free filler; from 1.5% to about 6% salt and other seasonings; from about 0.5 to about 3% moisture; and from about 25 to about 32% of said nondigestible fat.

3. The process of claim 1 wherein said cooking includes frying in a nondigestible fat.

4. The process of claim 1 wherein the ratio of corn masa to said fat free filler is from about 50:50 to 43:57, on a dry weight basis.

5. The process of claim 4 wherein said fat free filler comprises about equal amounts of starch, nondigestible fiber and protein.

6. The process of claim 1 wherein said dough comprises from 40 to 50 parts water; and wherein said cooking includes a baking step and a frying step; wherein said corn chips have, on a dry weight basis, a moisture level of from about 0.5% to about 3%, and from about 1.5% to about 2% salt.

7. The process of claim 1 wherein said corn masa has about 2%, by weight, digestible fat.

8. A process according to claim 1 wherein the aqueous dough further comprises about 0.5% to 5% emulsifier.

9. A process for making digestible fat free fabricated corn chips comprising the steps of:
   a. preparing a corn dough comprising, by weight, from about 30 parts to about 50 parts water; and about 50 parts to about 70 parts of a mixture of corn masa having about 4% or less, by weight, digestible fat, and starch in a ratio of corn masa to starch of from about 68:32 to about 30:70 on a dry weight basis;
   b. forming the dough into chips; and
   c. cooking the chips in a nondigestible fat; and
      wherein the fabricated corn chips comprise less than about 0.5 gram of digestible fat per 30 gram of fabricated corn chips.

10. A process according to claim 9 wherein the ratio of corn masa to starch is from about 50:50 to about 43:57.

11. A process for making digestible fat free fabricated corn chips comprising the steps of:
   a. preparing a corn dough comprising, by weight, from about 30% to about 50% water, from about 40% to about 50% corn masa, from about 20% to about 50% fat free filler, and from about 0% to about 5% emulsifier; wherein said corn masa has about 4% or less by, weight, digestible fat;
   b. forming the dough into chips; and
   c. cooking the chips with a nondigestible fat; and
      wherein the fabricated corn chips comprise less than about 0.5 gram of digestible fat per 30 gram of fabricated corn chips.

12. A process according to claim 11 wherein the step of cooking comprises frying the fabricated corn chips to a moisture level of from about 0.5% to about 4% in a nondigestible fat.

13. A process according to claim 11 wherein the step of cooking comprises the steps of:
   a) frying the fabricated corn chips in a nondigestible fat to a moisture level of no more than 10%; and
   b) subsequently baking the fabricated corn chips to a moisture level of no more than 4%.

14. A process according to claim 11 wherein the step of cooking comprises the steps of:
   a) coating the fabricated corn chips with a nondigestible fat; and
   b) subsequently baking the fabricated corn chips.

15. A process according to claim 11 wherein the step of cooking comprises the steps of:
   a) baking the fabricated corn chips to a moisture level of between 35% and 40%; and
   b) subsequently frying the fabricated corn chips in a nondigestible fat.

16. A process according to claim 11 wherein the ratio of corn masa to fat free filler on a dry weight basis is from about 68:32 to about 30:70.

17. A process according to claim 11 wherein the corn dough further comprises about 0.5% to 5% emulsifier.

18. A process of preparing digestible fat free corn chips comprising the steps of:
   a. preparing a corn dough by mixing together, by weight, from about 30 parts to about 50 parts water; and about 50 parts to about 70 pans of a mixture of corn masa and a fat-free filler selected from the group consisting of starch, protein and nondigestible fiber, and mixtures thereof, wherein the ratio of corn masa to fat-free filler, on a dry weight basis, is from about 68:32 to about 30:70; and from 0 to 10 parts essentially fat-free ingredients other than said fat-free filler; and wherein said corn masa has about 4% or less, by weight, digestible fat;
   b. sheeting the dough;
   c. cutting the dough into corn chip pieces; and
   d. baking said corn chip pieces for 12 to 18 seconds at a temperature of between 750° F. and 900° F. (399° C. to 483° C.), wherein when baked said corn chips pieces comprise, by weight, from about 35% to about 40% moisture; and
   e. frying said corn chip pieces in nondigestible fat at 300° F. to 400° F. (148.9° C. to 204.2° C.); and
      wherein when fried, said corn chips comprise, by weight, from about 20% to 45% corn masa; from about 20% to about 50% fat-free filler; from about 1% to about 35% nondigestible fat; from 0% to about 4% moisture; and from about 0% to about 10% of other essentially fat-free ingredients other than said fat-free filler; and wherein said corn chips contain less than about 0.5 gram of residual and/or intrinsic digestible fat per 30 gram serving.

19. A process of preparing digestible fat free corn chips comprising the steps of:
   a. preparing an aqueous dough comprising, by weight, from about 50 parts to about 70 parts of a mixture of corn masa having about 4% or less, by weight, digestible fat, and a fat free filler selected from the group consisting of starch, protein, nondigestible fiber, and mixtures thereof, wherein the ratio of corn masa to fat free filler, on a dry weight basis, is from about 68:32 to about 30:70; from about 30 parts to about 50 parts water; and from 0 to 10 parts essentially fat free ingredients other than said fat free filler;
   b. sheeting said aqueous dough;
   c. preparing raw corn chip pieces from said aqueous dough; and
   d. cooking said raw corn chip pieces in nondigestible fat at 300° F. to 400° F. (148.9° C. to 204.4° C.); and
      wherein when cooked, said corn chips comprise, by weight, from about 20% to 45% corn masa; from about 20% to about 50% of fat-free filler; from about 1% to about 35% of nondigestible fat; from 0% to about 4% moisture; and from about 0% to about 10% of essentially fat free ingredients other than said fat free filler; and wherein said corn chips contain less than about 0.5 gram of residual and/or intrinsic digestible fat per 30 gram serving.

* * * * *